United States Patent
Lee et al.

(10) Patent No.: US 8,279,795 B2
(45) Date of Patent: Oct. 2, 2012

(54) RELAY STATION, TERMINAL AND BASE STATION IN CELLULAR SYSTEM, AND METHOD FOR RELAYING BETWEEN TERMINAL AND BASE STATION

(75) Inventors: Hyo-Jin Lee, Daejeon (KR); Hyun-Kyu Chung, Daejeon (KR); Jae-Kyun Kwon, Daejeon (KR); Jae-Young Ahn, Daejeon (KR); Hee-Soo Lee, Daejeon (KR); Byung-Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 982 days.

(21) Appl. No.: 12/302,204

(22) PCT Filed: May 22, 2007

(86) PCT No.: PCT/KR2007/002480
§ 371 (c)(1),
(2), (4) Date: Nov. 24, 2008

(87) PCT Pub. No.: WO2007/136220
PCT Pub. Date: Nov. 29, 2007

(65) Prior Publication Data
US 2009/0312030 A1    Dec. 17, 2009

(30) Foreign Application Priority Data

May 22, 2006 (KR) .................. 10-2006-0045612
Feb. 2, 2007 (KR) .................. 10-2007-0011015

(51) Int. Cl.
*H04B 7/14*     (2006.01)

(52) U.S. Cl. ............................................ 370/315; 455/7
(58) Field of Classification Search .................... None
See application file for complete search history.

(56) References Cited

U.S. PATENT DOCUMENTS

| 5,157,709 | A  | * | 10/1992 | Ohteru ..................... 455/465 |
| 6,226,520 | B1 | * | 5/2001  | Jeoung ................... 455/452.2 |
| 6,240,125 | B1 | * | 5/2001  | Andersson et al. ......... 375/132 |
| 6,473,617 | B1 | * | 10/2002 | Larsen et al. ............ 455/446 |

(Continued)

FOREIGN PATENT DOCUMENTS

EP     1324509     7/2003

(Continued)

*Primary Examiner* — Bunjob Jaroenchonwanit
(74) *Attorney, Agent, or Firm* — Rabin & Berdo, P.C.

(57) ABSTRACT

Disclosed are a base station, a relay station, and a terminal according to a method for designing a cellular system for improving resource usage efficiency by reducing interference between relay stations and interference between the base station and the relay station. The relay station gets control signals that terminals served by the base station transmit, and registers terminals, levels of the control signals of which are bigger than a predetermined value, to a list of the interference terminals. The relay station checks an interference resource through resource allocation information of the base station, checks an available resource corresponding to a resource except the interference resource among a resource allocated by the base station, and allocates some of the available resource to the terminal.

17 Claims, 4 Drawing Sheets

U.S. PATENT DOCUMENTS

| | | | |
|---|---|---|---|
| 6,907,257 B1 * | 6/2005 | Mizutani et al. | 455/464 |
| 7,969,910 B2 * | 6/2011 | Barak et al. | 370/254 |
| 2002/0015393 A1 * | 2/2002 | Pan et al. | 370/335 |
| 2002/0044614 A1 * | 4/2002 | Molnar et al. | 375/346 |
| 2002/0115474 A1 * | 8/2002 | Yoshino et al. | 455/562 |
| 2004/0053592 A1 * | 3/2004 | Reial | 455/303 |
| 2005/0117676 A1 * | 6/2005 | Liu | 375/346 |
| 2006/0014536 A1 * | 1/2006 | Demirhan et al. | 455/434 |
| 2007/0214247 A1 * | 9/2007 | Yang et al. | 709/223 |

FOREIGN PATENT DOCUMENTS

| | | |
|---|---|---|
| KR | 1999-0085776 | 12/1999 |
| KR | 2000-0073734 | 12/2000 |
| KR | 2000-0075950 | 12/2000 |
| KR | 2003-0010137 | 2/2003 |
| WO | WO-2006/062316 | 6/2006 |

* cited by examiner

[Fig. 1]
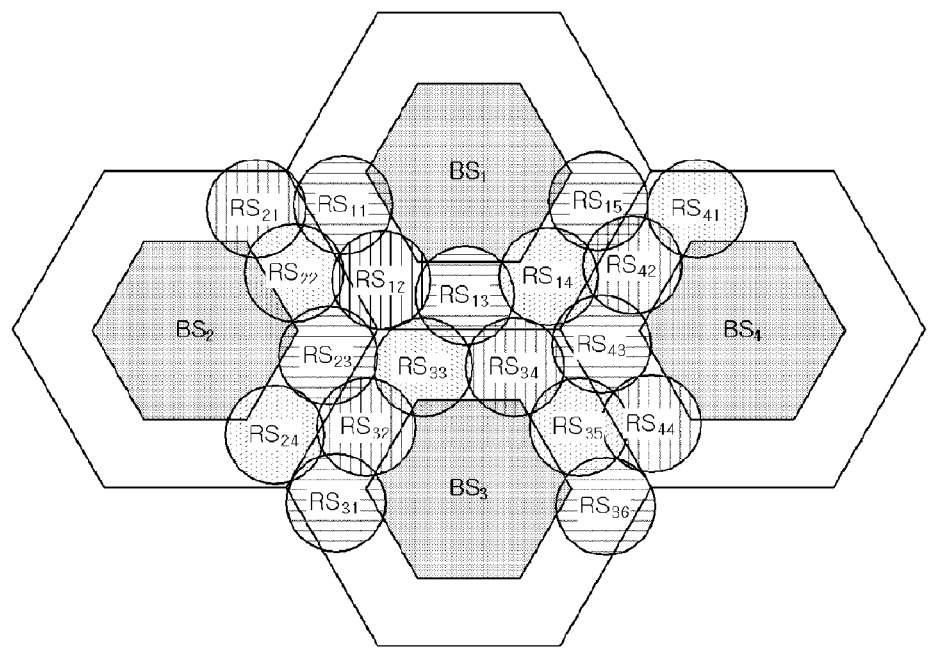
[Fig. 2]
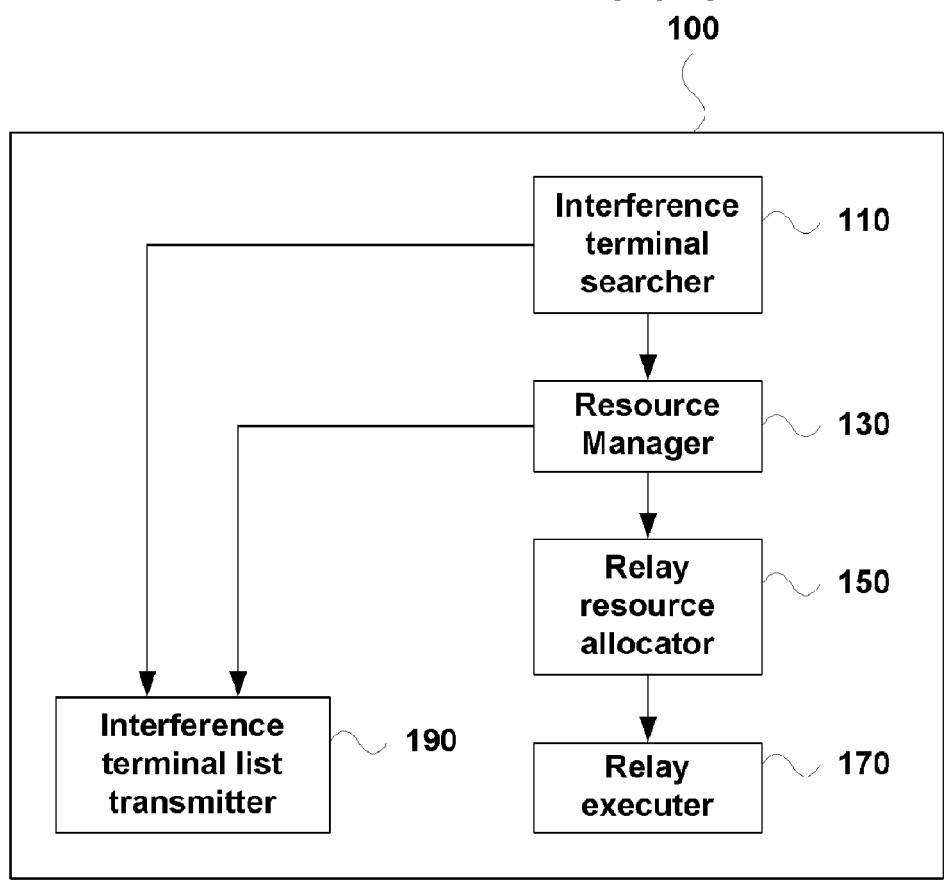

[Fig. 3]
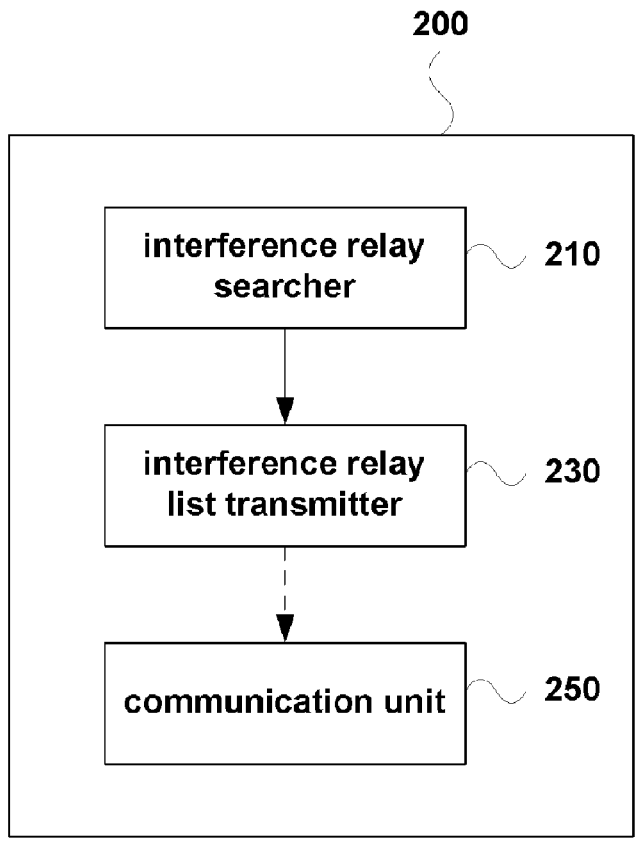
[Fig. 4]
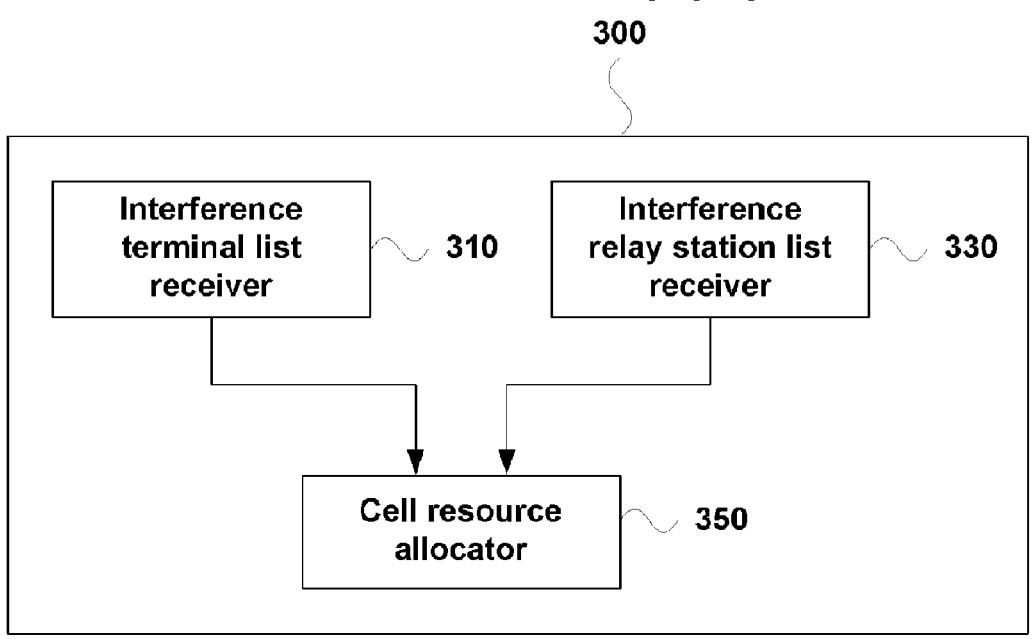

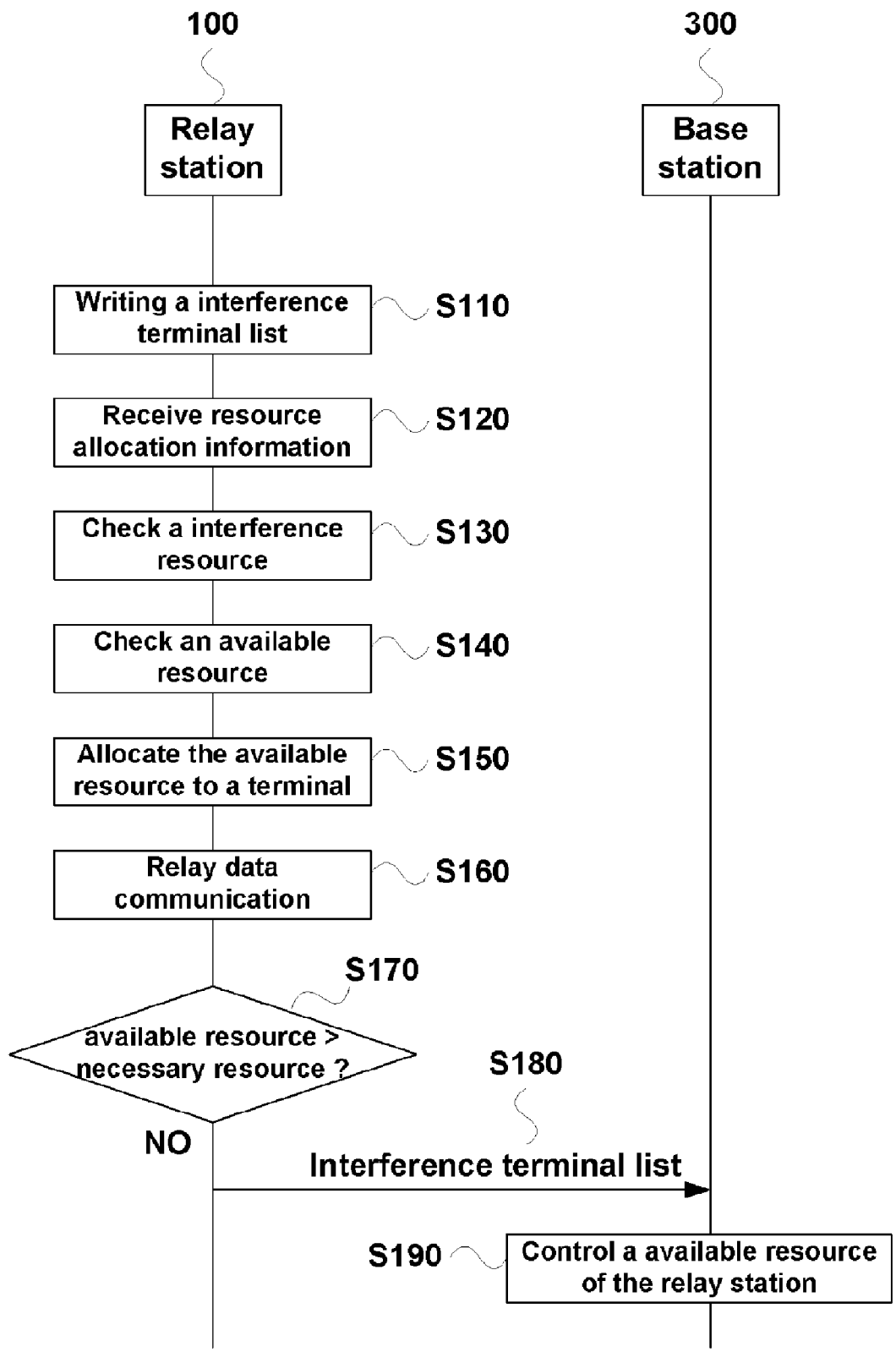

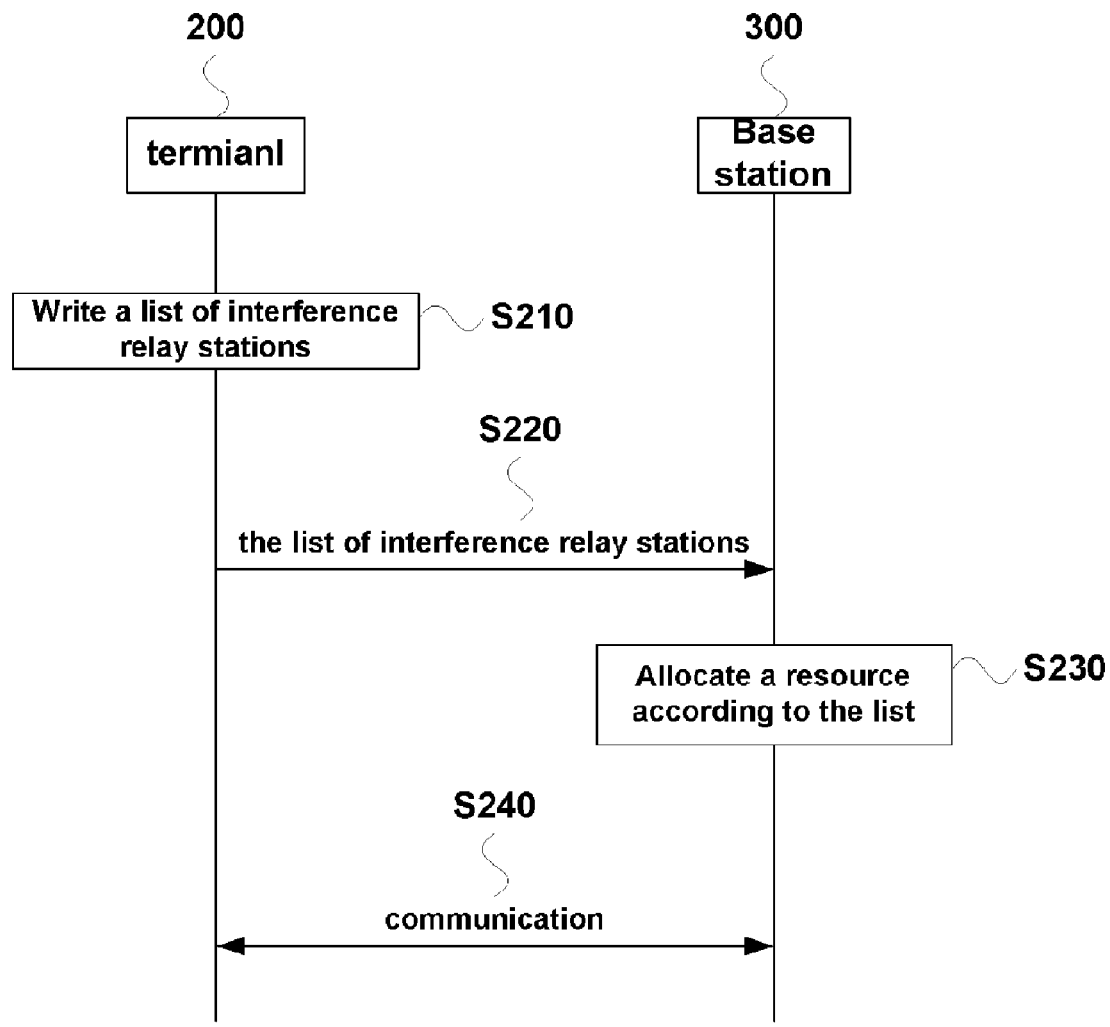

RELAY STATION, TERMINAL AND BASE STATION IN CELLULAR SYSTEM, AND METHOD FOR RELAYING BETWEEN TERMINAL AND BASE STATION

TECHNICAL FIELD

The present invention relates to a relay station, a terminal, a base station, and a method for relaying between the base station and the terminal in a cellular system. In particular, the present invention relates to a method for designing a cellular system for improving resource usage efficiency by reducing interference between relay stations and interference between the base station and the relay station.

BACKGROUND ART

A prior cellular system used a frequency of 2 GHz bands, but a cellular system for next generation mobile communication must use a high frequency of 2-6 GHz bands. As this high frequency has robust straightness, the cellular system for next generation mobile communication have many shadow areas generated by obstacles such as high buildings. Also, as a radio wave of a high frequency band has a large path loss, cell coverage of the cellular system for next generation mobile communication is smaller than that of the prior cellular system. As signal-to-noise ratios (Eb/No) become smaller because of limited power for improved transmission speed of next generation mobile communication, cell coverage becomes increasingly smaller. For solving coverage or data rate, research regarding low-cost relay stations is progressing according to IEEE 802.16j, WINNER project, etc. Introducing these relay stations forms new interference environments which generates interference control problems.

For this interference control problem, adjacent cells in a prior cellular system based on frequency division multiple access (FDMA) or time division multiple access (TDMA) do not use common resource to avoid interference. This resource usage method provides a sufficient signal-to-noise ratio, but has low frequency reuse efficiency.

On the other hand, a prior cellular system based on code division multiple access (CDMA) reduces fluctuation of interference by averaging interference and makes all channels have suitable interference to greatly improve frequency reuse efficiency. However, because of the direction of main service being changed from voice service with a constant data rate to packet service with a variable data rate, the method for improving frequency reuse efficiency through averaging interference is no longer an ideal method. Further, technology with easy interference avoidance such as orthogonal frequency division multiplexing (OFDM) and orthogonal frequency division multiple access (OFDMA) is being adapted to the cellular system. However, a method for not only solving interference problems generated by adapting relay stations to the cellular system of OFDM and OFDMA but also maximizing resource usage efficiency has not yet been introduced.

DISCLOSURE OF INVENTION

Technical Problem

The present invention has been made in an effort to provide a base station, a relay station, and a terminal according to a method for designing a cellular system for improving resource usage efficiency by reducing interference between relay stations and interference between the base station and the relay station.

Technical Solution

A relay station for relaying between a terminal and a base station according to an exemplary embodiment of the present invention comprises an interference terminal searcher, a resource manager, a relay resource allocator, a list transmitter, and a relay executer. The interference terminal searcher searches interference terminals that interfere with the relay station, and writes a list of the interference terminals. The resource manager checks an interference resource through resource allocation information of the base station to check an available resource, wherein the interference resource is a resource allocated to the interference terminals and the available resource is a resource allocated to the relay station except the interference resource. The relay resource allocator allocates some or all of the available resource to the terminal. The list transmitter transmits the list of the interference terminals to the base station so that the base station executes resource allocation for terminals in direction of increasing the available resource using the list of the interference terminals. The relay executer relays between the base station and the terminal with a resource that the relay resource allocator allocates.

The interference terminal searcher may search the interference terminals through control signals that terminals served by the base station transmit, and register terminals, levels of the control signals of which are bigger than a predetermined value, to the list of the interference terminals.

A relay station for relaying between a terminal and a base station according to other exemplary embodiment of the present invention gets control signals that terminals served by the base station transmit, and registers terminals, levels of the control signals of which are bigger than a predetermined value, to a list of the interference terminals. And the relay station receives, from the base station, resource allocation information of the base station, checks an interference resource through resource allocation information of the base station, wherein the interference resource is a resource allocated to the interference terminals, checks an available resource, wherein the available resource is a resource allocated by the base station except the interference resource, and allocates some or all of the available resource to the terminal.

A terminal served by a base station according to another exemplary embodiment of the present invention comprises an interference relay searcher, a list transmitter, and a communication unit. The interference relay searcher searches interference relays to write a list of the interference relays, wherein the interference relays interfere with the terminal. The list transmitter transmits the list of the interference relays to the base station. The communication unit obtains some or all of a resource used by the base station except an interference resource used by the interference relays, to execute data communication with the base station through the obtained resource.

A base station for communicating with a terminal through relay of a relay station according to another exemplary embodiment of the present invention comprises an interference terminal list receiver, an interference relay list receiver, and a cell resource allocator. The interference terminal list receiver receives a list of interference terminals from the relay station. The interference relay list receiver receives a list of interference relay stations from a terminal. The cell resource allocator checks an available resource of the relay station through the list to perform resource allocation for the interference terminals so that the available resource of the relay station increases. The cell resource allocator may allocate, to the terminal transmitting the list of interference relay stations, a resource except a resource that the interference relay stations use among a resource that the base station uses.

BRIEF DESCRIPTION OF THE DRAWINGS

FIG. 1 is a diagram representing cell composition and resource allocation information of a cellular system according to an exemplary embodiment of the present invention.

FIG. 2 is a block diagram representing a relay station according to an exemplary embodiment of the present invention.

FIG. 3 is a block diagram representing a terminal according to an exemplary embodiment of the present invention.

FIG. 4 is a block diagram representing a base station according to an exemplary embodiment of the present invention.

FIG. 5 is a diagram representing a method for avoiding interference between a base station and a relay station according to a first exemplary embodiment of the present invention.

FIG. 6 is a diagram representing a method for avoiding interference between a base station and a relay station according to a second exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" will be understood to imply the inclusion of stated elements but not the exclusion of any other elements.

A cellular system according to an exemplary embodiment of the present invention will now be described with reference to FIG. 1.

FIG. 1 is a diagram representing cell composition and resource allocation information of a cellular system according to an exemplary embodiment of the present invention.

As shown in FIG. 1, the cellular system according to the exemplary embodiment of the present invention comprises a plurality of base stations (BS's) and a plurality of relay stations (RS's). A base station serves one or more cells. A relay station $RS_{ix}$ is installed in a boundary area of a cell and reuses a resource that a base station $BS_i$ uses.

In FIG. 1, a base station uses a resource area equal to a resource area that an adjacent base station uses, and a relay station uses a resource area orthogonal to a resource area that an adjacent relay station uses. Concretely, a base station $BS_1$ uses a resource area that is equal to a resource area that adjacent base stations $BS_1$, $BS_2$, and $BS_3$ use. Therefore, a resource reuse factor between base stations is 1, and a resource reuse factor between relay stations is 3.

On the other hand, because of cost and operation, coverage of a relay station is designed to be smaller than coverage of a base station. Therefore, a necessary resource of the relay station is smaller than a necessary resource of the base station. If relay stations use a resource reuse factor of more than 1 and adjacent relay stations use an orthogonal resource, interference between relay stations can be avoided. However, problem of interference between a base station and a relay station remains.

A method for reducing interference between a base station 300 and a relay station 100 according to an exemplary embodiment of the present invention will now be described with reference to FIG. 2 to FIG. 6.

FIG. 2 is a block diagram representing a relay station 100 according to an exemplary embodiment of the present invention.

As shown in FIG. 2, the relay station 100 comprises an interference terminal searcher 110, a resource manager 130, a relay resource allocator 150, a relay executer 170, and an interference terminal list transmitter 190. The interference terminal searcher 110 searches interfere terminals that interfere with the relay station 100, and write a list of the interfere terminals. The resource manager 130 checks an available resource of the relay station 100. The relay resource allocator 150 allocates the available resource of the relay station 100 to a terminal 200. The relay executer 170 relays data communication between the base station 300 and the terminal 200 through a resource allocated by the relay resource allocator 150. The interference terminal list transmitter 190 transmits the list of the interfere terminals to the base station 300.

FIG. 3 is a block diagram representing a terminal 200 according to an exemplary embodiment of the present invention.

As shown in FIG. 3, the terminal 200 comprises an interference relay searcher 210, an interference relay list transmitter 230, and a communication unit 250. The interference relay searcher 210 searches interference relay stations that interfere with the terminal 200, and writes a list of the interference relay stations. The interference relay list transmitter 230 transmits the list of the interference relay stations to the base station 300. The communication unit 250 performs data communication with the base station 300.

FIG. 4 is a block diagram representing a base station 300 according to an exemplary embodiment of the present invention.

As shown in FIG. 4, the base station 300 comprises an interference terminal list receiver 310, an interference relay list receiver 330, and a cell resource allocator 350. The interference terminal list receiver 310 receives the list of the interference terminals from the relay station 100. The interference relay list receiver 330 receives the list of the interference relay stations from the terminal 200. The cell resource allocator 350 performs resource allocation for the terminals 200 through the list of the interference terminals and the list of the interference relay stations.

FIG. 5 is a diagram representing a method for avoiding interference between a base station 300 and a relay station 100 according to a first exemplary embodiment of the present invention.

Firstly, the interference terminal searcher 110 of the relay station 100, in step S110, searches terminals that are adjacent to the relay station 100 and interfere with the relay station 100, and writes a list of interference terminals. At this time, the interference terminal searcher 110 may obtain a control signal that terminals served by the base station transmit, and write the list of interference terminals by registering, to the list, information on terminals of which level of the control signal is larger than a critical value. Also, at this time, the relay station 100 or the base station 300 may control the critical value to adjust the integrity of the radio link. For example, if the critical value is small, the effect of interference avoidance is high, and signal-to-noise ratio increases. On the other hand, the list of interference terminals may be written by the base station 300. However, since terminals served by a relay station transmit the control signal through relatively low transmission power in relation to terminals served by a base station, it may be difficult for the base station to obtain the control signal. Also, since the base station 300 has many relay stations, the base station 300 must obtain many control signals. Therefore, in an exemplary embodiment of the present invention, it is assumed that the list of interference terminals is written by the relay station 100.

Next, the resource manager 130 of the relay station 100 receives, in step S120, resource allocation information that the base station 300 broadcasts. This resource allocation information may comprise uplink resource allocation information and downlink resource allocation information.

In step S130, the resource manager 130 checks, through resource allocation information of the base station 300, an interference resource that is a resource allocated to terminals belonging to the list of interference terminals. Further, in step S140, the resource manager 130 checks an available resource that is a resource except the interference resource among a resource allocated to the relay station 100.

In step S150, the relay resource allocator 150 allocates, according to a resource allocation algorithm, some or all of the available resource that the resource manager 130 checks, to terminals that request service of the relay station 100.

In step S160, the relay executer 170 relays data communication between the base station 300 and the terminal 200 through a resource allocated by the relay resource allocator 150.

Through steps S110 to S160, terminals served by the relay station 100 can avoid interference generated by terminals served by the base station 300. Similarly, terminals served by the base station 300 can avoid interference generated by terminals served by a relay station adjacent to themselves, and since terminals served by the relay station 100 use a resource orthogonal to a resource that terminals served by an adjacent relay station use, they can also avoid interference generated by terminals served by the adjacent relay station.

On the other hand, through steps S110 to S160, terminals served by the base station 300 can avoid interference generated by terminals served by a relay station adjacent to themselves. However, the terminals served by the base station 300 get interference generated by terminals served by other relay station that is not adjacent to themselves. However, as stated above, if the coverage of a relay station is designed to be smaller than the coverage of a base station, transmission power of terminals served by the relay station is smaller than transmission power of terminals served by the base station. Therefore, this problem can be solved.

On the other hand, in step S170, as the number of terminals that interfere with the relay station 100 increases, the available resource $N_{available}$ of the relay station 100 may be smaller than the necessary resource $N_{required}$ for the relay station 100 to relay between the base station 300 and the terminal 200. In this case, the interference terminal list transmitter 190, in step S180, may transmit the list of interference terminals to the interference terminal list receiver 310 of the base station 300 so that the cell resource allocator 350 of the base station 300 may use the list of interference terminals for allocating resources. The interference terminal list transmitter 190 of the relay station 100 may transmit information on each of the interference terminals to the interference terminal list receiver 310 of the base station 300.

In step S190, the cell resource allocator 350 of the base station 300 that receives the list of interference terminals appropriately maintains the available resource of the relay station 100. Since the cell resource allocator 350 can confirm an amount of data to relay, it can determine an amount of necessary resources. Also the cell resource allocator 350 can confirm the available resource of the relay station 100 through the list of interference terminals. Therefore if an amount of resources that the relay station 100 needs is greater than the available resource of the relay station 100, the cell resource allocator 350 performs resource allocation for terminals belonging to the list of interference terminals to increase the available resource of the relay station 100. For this, the cell resource allocator 350 may reduce the resource allocation rate or communication power for terminals belonging to the list of interference terminals to appropriately maintain an amount of the available resource. The cell resource allocator 350 may allocate, to the interference terminals, a resource except a resource that the relay station 100 uses among a resource that the base station 300 uses so that the cell resource allocator 350 maintains the available resource of the relay station 100 appropriately.

FIG. 6 is a diagram representing a method for avoiding interference between a base station 300 and a relay station 100 according to a second exemplary embodiment of the present invention.

Firstly, in step S210, the interference relay searcher 210 of the terminal 200 searches relay stations that are adjacent to the terminal 200 and interfere with the terminal 200 and writes a list of interference relay stations. At this time, the interference relay searcher 210 may obtain a pilot signal or a preamble that relay stations transmit, and write the list of interference relay stations by registering, to the list, information on relay stations of which level of the pilot signal or the preamble is larger than a critical value. The list of interference relay stations may comprises the eigen-number corresponding to the identifier of each of the interference relay stations and interference level information of each of the interference relay stations.

In step S220, the interference relay list transmitter 230 of the terminal 200 may transmit the list of interference relay stations to the interference relay list receiver 330 of the base station 300 so that the cell resource allocator 350 of the base station 300 uses the list for allocating resources to terminals.

The base station 300 that receives the list of interference relay stations can confirm a resource that relay stations belonging to the list use. Therefore, in step S230, the cell resource allocator 350 allocates a resource except a resource that relay stations belonging to the list use, to the terminal 200 that transmits the list.

Further, the communication unit 250 of the terminal 200 performs data communication with the base station 300 through the allocated resource.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to an exemplary embodiment of the present invention, since all base stations use the same area of resources and a relay station uses a resource orthogonal to a resource that an adjacent relay station uses among resources that a base station belonging to the relay station uses, the resource usage efficiency can be maximized.

Also, according to an exemplary embodiment of the present invention, since each of adjacent relay stations uses orthogonal resources, interference between relay stations may be avoided. And since a relay station searches interference terminals and allocates, to terminals, resources except resources that the interference terminals use, interference between a relay station and a base station may be avoided. Moreover, since a terminal searches interference relay stations and uses resources except resources that the interference relay stations use, interference between a relay station and a base station may be avoided.

In addition, as an exemplary embodiment of the present invention uses resource map information of a cellular system based on OFDM, it may be easily adapted to the cellular system based on OFDM.

The invention claimed is:

1. A relay station for relaying between a terminal and a base station, comprising:
   an interference terminal searcher that registers interference terminals to a list of interference terminals, the list identifying at least one terminal that interferes with the relay station;
   a resource manager that receives resource allocation information from the base station and identifies an interference resource through the resource allocation information to check an available resource, wherein the interference resource is a resource allocated to the interference terminals registered in the list and the available resource is a resource except the interference resource among resources allocated by the base station; and
   a relay resource allocator that allocates at least a portion of the available resource to the terminal.

2. The relay station of claim 1, wherein the interference terminal searcher searches for the interference terminals through control signals from terminals served by the base station.

3. The relay station of claim 2, wherein the interference terminal searcher registers terminals, which transmit, control signals having levels greater than a predetermined value, to the list of the interference terminals.

4. The relay station of claim 1, further comprising a list transmitter that transmits the list of the interference terminals to the base station so that the base station executes resource allocation for terminals in a direction of increasing the available resource using the list of the interference terminals.

5. The relay station of claim 4, wherein the list transmitter transmits the list of the interference terminals to the base station when the available resource is smaller than a resource that the relay station needs.

6. The relay station of claim 5, further comprising a relay executer that relays between the base station and the terminal through a resource allocated by the relay resource allocator.

7. The relay station of claim 1, wherein the relay station is located in a boundary area of a cell that the base station controls.

8. The relay station of claim 7, wherein the resource allocated to the relay station is some of a resource used by the base station and is orthogonal to a resource used by another relay station adjacent to the relay station.

9. The relay station of claim 8, wherein coverage of the relay station is smaller than coverage of the base station.

10. A method for relaying between a terminal and a base station, comprising:
    receiving control signals from terminals served by the base station;
    registering terminals that transmit control signals having levels larger than a predetermined value to a list of interference terminals;
    receiving resource allocation information from the base station;
    identifying an interference resource through the resource allocation information, wherein the interference resource is a resource allocated to the interference terminals;
    identifying an available resource, wherein the available resource is a resource except the interference resource among resources allocated by the base station; and
    allocating at least a portion of the available resource to the terminal.

11. The method of claim 10, further comprising:
    relaying communication between the base station and the terminal using a resource allocated to the terminal.

12. The method of claim 11, further comprising:
    transmitting the list of the interference terminals to the base station when the available resource is smaller than a resource that the relay station needs, so that the base station executes resource allocation for terminals in direction of increasing the available resource using the list of the interference terminals.

13. A terminal served by a base station, the terminal comprising:
    an interference relay searcher that writes a list of interference relays, the list identifying at least one relay that interferes with the terminal;
    a list transmitter that transmits the list of the interference relays to a base station; and
    a communication unit that obtains at least a portion of resources used by the base station except an interference resource used by the interference relays, and executes data communication with the base station through the obtained resource;
    wherein the interference relay searcher searches for the interference relays based at least partly on a pilot signal or a preamble transmitted by relays.

14. The terminal of claim 13, wherein the interference relay searcher registers relays, which transmit a pilot signal or a preamble having a level, larger than a predetermined value, to the list of the interference relays.

15. A base station for communicating with a terminal through relay of a relay station, comprising:
    an interference terminal list receiver that receives, from the relay station, a list of interference terminals; and
    a cell resource allocator that identifies an available resource of the relay station through the list and performs resource allocation for the interference terminals so that the available resource of the relay station increases;
    wherein the cell resource allocator controls communication power for the interference terminals; and
    wherein the cell resource allocator performs resource allocation for the interference terminals so that the available resource of the relay station increases when a necessary resource for relay of the relay station is greater than the available resource.

16. The base station of claim 15, further comprising:
    an interference relay list receiver that receives a list of interference relay stations from a terminal served by the base station, wherein the cell resource allocator allocates, to the terminal that transmits the list of interference relay stations, one of the resources that the base stations uses except resources that the interference relay stations use.

17. The base station of claim 15, wherein the cell resource allocator controls a resource allocation rate for the interference terminals.

* * * * *